(12) United States Patent
Namburi et al.

(10) Patent No.: US 7,824,763 B2
(45) Date of Patent: Nov. 2, 2010

(54) COMPOSITE MATERIAL FOR TURBINE SUPPORT STRUCTURE

(75) Inventors: Adi Narayana Namburi, Bangalore (IN); Hayagreeva Rao, Bangalore (IN); Chinniah Thiagarajan, Karnataka (IN)

(73) Assignee: General Electric Company, Schenectady, NY (US)

( * ) Notice: Subject to any disclaimer, the term of this patent is extended or adjusted under 35 U.S.C. 154(b) by 813 days.

(21) Appl. No.: 11/688,914

(22) Filed: Mar. 21, 2007

(65) Prior Publication Data

US 2008/0233372 A1    Sep. 25, 2008

(51) Int. Cl.
*B32B 7/02* (2006.01)
*B32B 9/00* (2006.01)

(52) U.S. Cl. .................. 428/212; 428/218; 428/688; 428/689; 428/697; 428/704

(58) Field of Classification Search .................. 428/212, 428/218, 688, 689, 697, 704
See application file for complete search history.

(56) References Cited

U.S. PATENT DOCUMENTS 6,779,963 B2* 8/2004 Kang ........................ 415/1
6,966,758 B2* 11/2005 Grabau et al. ........... 416/229 R

OTHER PUBLICATIONS

McGuire, "Composites: Negative-coefficient materials can point the way to positive value in the right matrixes," Today's Chemist at Work, Nor. 2002, pp. 24-28.

* cited by examiner

*Primary Examiner*—Gwendolyn Blackwell
(74) *Attorney, Agent, or Firm*—Sutherland Asbill & Brennan LLP

(57) ABSTRACT

A composite material for use in turbine support structures. The composite material may include a first material having a positive coefficient of thermal expansion and a second material having a negative coefficient of thermal expansion, a negative Poisson ratio, or both a negative coefficient of thermal expansion and a negative Poisson ratio.

12 Claims, 2 Drawing Sheets

COMPOSITE MATERIAL FOR TURBINE SUPPORT STRUCTURE

TECHNICAL FIELD

The present application relates to composite materials and more particularly relates to a composite material having controlled thermal expansion for use in turbine support structures.

BACKGROUND OF THE INVENTION

The clearance between a turbine blade and the turbine housing, known as the tip clearance, is critical to the performance of a turbine. Tip clearances that are too large result in leakages that are detrimental to turbine performance. Tip clearances that are too small may result in friction or wear within a turbine and may cause turbine malfunction. Maintenance of tip clearances at a suitable level is important for efficient and robust operation of steam turbines and gas turbines.

An important factor affecting tip clearances is the thermal expansions of the support structures of turbines. The outer shell of a turbine generally is supported by a structure separate from that supporting the turbine rotor. The outer shell of turbines often have extensions known as shell arms, which rest on standards. Similarly, rotors often are supported in standards on journal bearings. As the turbine heats during operation, gases flowing through the outer shell of the turbine heat the shell. The heat is transmitted through the shell to the shell support structure. Rotor support structures also heat during turbine operation but to a lesser degree than shell support structures.

Known materials used in turbine support structures expand when heated. Because of the differing degrees of heating, turbine shell and rotor support structures constructed of known materials may exhibit differing vertical expansions during turbine operation. The differing vertical expansions can affect tip clearances inside the turbine.

There is a desire, therefore, to provide a material for turbine support structures with minimal or controlled thermal expansion. Use of such a material may avoid the tip clearance problems caused by the thermal expansion of turbine support structures constructed of known materials.

BRIEF DESCRIPTION OF THE INVENTION

In one embodiment, the present application provides a composite material. The composite may include a first material having a positive coefficient of thermal expansion and a second material having a negative coefficient of thermal expansion, a negative Poisson ratio, or both a negative coefficient of thermal expansion and a negative Poisson ratio.

Another embodiment of the present application provides for a turbine having a support structure that may include a first material having a positive coefficient of thermal expansion and a second material having a negative coefficient of thermal expansion, a negative Poisson ratio, or both a negative coefficient of thermal expansion and a negative Poisson ratio.

A further embodiment of the present application provides for a method of supporting a turbine including providing a support structure that may include a first material having a positive coefficient of thermal expansion and a second material having a negative coefficient of thermal expansion, a negative Poisson ratio, or both a negative coefficient of thermal expansion and a negative Poisson ratio, and heating the support structure.

DETAILED DESCRIPTION OF THE INVENTION

Figure 1:
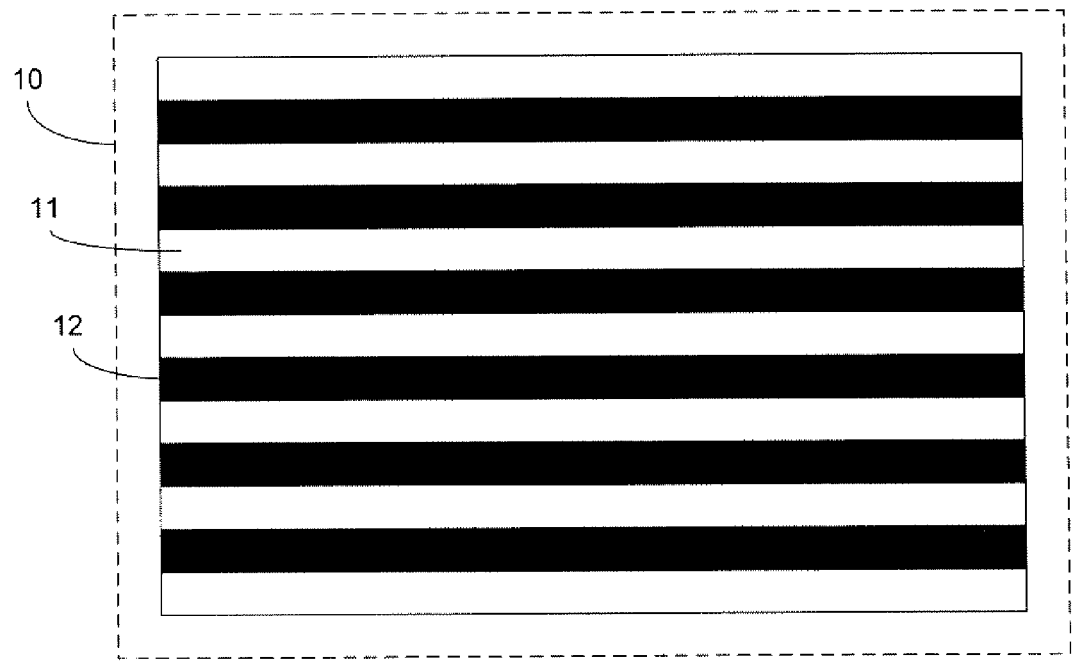
FIG. 1 is a cross-sectional view of the composite material of an embodiment of the present application as described herein.

Referring now to the drawings, in which like numerals indicate like elements throughout the separate views, FIG. 1 shows a cross-sectional view of a composite material 10 of a particular embodiment of the present application. Composite materials are materials that result when two or more distinct materials, each having its own, usually different, characteristics, are combined. The combination may provide a composite with useful properties for specific applications. For example, composites may be useful in applications where thermal expansion is to be controlled. Thermal expansion is the dimensional change exhibited by a material as the temperature of the material changes.

The composite material 10 includes a first material 11 and a second material 12. The first material 11 has a positive coefficient of thermal expansion. A coefficient of thermal expansion is the fractional change in length or volume of a material per degree of temperature change. A material having a positive coefficient of thermal expansion increases in length or volume as temperature is increased. Nonlimiting examples of materials having a positive coefficient of thermal expansion include metals, ceramics, glass, thermoset polymers, thermoplastics, and alloys or combinations thereof. Nonlimiting examples of metals having a positive coefficient of thermal expansion include cast iron, cast steel, and low chrome alloy. Nonlimiting examples of thermoset polymers having a positive coefficient of thermal expansion include epoxy, polyimide, and high-temperature polyesters. Nonlimiting examples of thermoplastics having a positive coefficient of thermal expansion include polyimides, polyetherimides, polytetrafluoroethylenes, polyether-ketones, polyether-etherketones, and polyether-ketone-ketones.

The second material 12 has a negative coefficient of thermal expansion, a negative Poisson ratio, or both a negative coefficient of thermal expansion and a negative Poisson ratio. A material having a negative coefficient of thermal expansion decreases in length or volume as temperature is increased. A Poisson ratio is the ratio of the transverse contracting strain to the elongation strain as a load is applied to a material. Materials having a negative Poisson ratio expand in a direction normal to an applied load. Materials having a negative Poisson ratio also are known as auxetic materials. Nonlimiting examples of materials having a negative coefficient of thermal expansion, a negative Poisson ratio, or both a negative coefficient of thermal expansion and a negative Poisson ratio include iron-nickel alloys, carbon fiber, graphite fiber, carbon nanotubes, aramid fiber, zirconium tungstate, zeolite, and combinations thereof.

By combining the first material 11 and the second material 12, a composite material 10 is formed. The overall coefficient of thermal expansion of the composite material 10 may be controlled by varying the relative amounts of the first material 11 and the second material 12. The overall coefficient of thermal expansion of the composite material 10 also may be controlled by varying the structure of the composite material 10. In one embodiment, the composite material 10 includes a layered matrix of the first material 11 and the second material 12 formed of alternating layers or strata of the first material 11 and the second material 12. In another embodiment, the coefficient of thermal expansion of the composite material 10 may be designed to be about be about equal to the coefficient of thermal expansion of another material. In yet another embodiment, the coefficient of thermal expansion of the composite material 10 may be designed to be about zero. Approximately zero thermal expansion refers to thermal expansion less than about 5 ppm/° C.

In particular applications of the composite material, such as in turbine support structures, control of thermal expansion in one direction, such as the vertical direction or y-axis, may be desirable. Vertical generally refers to the direction normal to the plane of the horizon. In an embodiment of the present application, the first material 11 and the second material 12 may be combined in a manner to provide approximately zero net vertical thermal expansion of the composite material 10.

In yet another embodiment, the composite material 10 includes a first material 11 having a positive coefficient of thermal expansion, a second material 12 having a negative coefficient of thermal expansion, and a third material having a negative Poisson ratio. In a particularly desirable embodiment, a composite material 10 having a coefficient of thermal expansion of about zero includes an epoxy-based polymer system with glass fibers having a positive coefficient of thermal expansion, carbon graphite fibers having a negative coefficient of thermal expansion, and zeolite filler.

Figure 2:
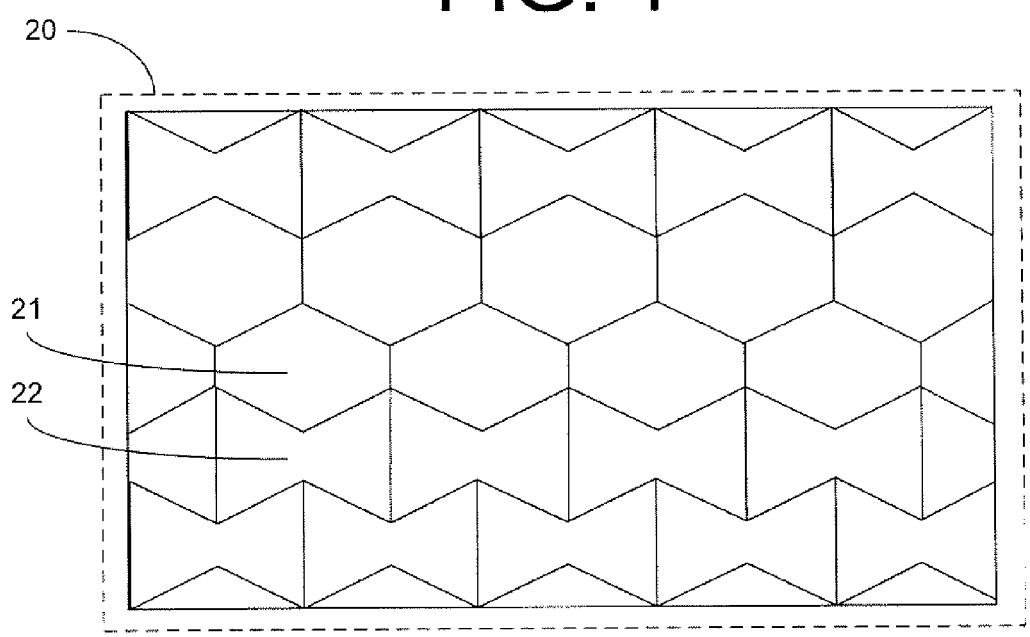
FIG. 2 is a cross-sectional view of the microstructure of an embodiment of the present application as described herein.

FIG. 2 shows a cross-sectional view of the microstructure of a composite material 20 of a particularly desirable embodiment of the present application. The composite material 20 includes a first material 21 and a second material 22. The first material 21 has a positive coefficient of thermal expansion. The second material 22 has a negative coefficient of thermal expansion, a negative Poisson ratio, or both a negative coefficient of thermal expansion and a negative Poisson ratio. The first material 21 and second material 22 are arranged in a layered matrix such that the thermal expansion of the first material 21 is offset by the thermal contraction, contraction under an applied load, or both thermal contraction and contraction under an applied load of the second material 22. In a preferred embodiment, the first material 21 and the second material 22 are arranged to provide approximately zero net thermal expansion of the overall structure.

Figure 3:
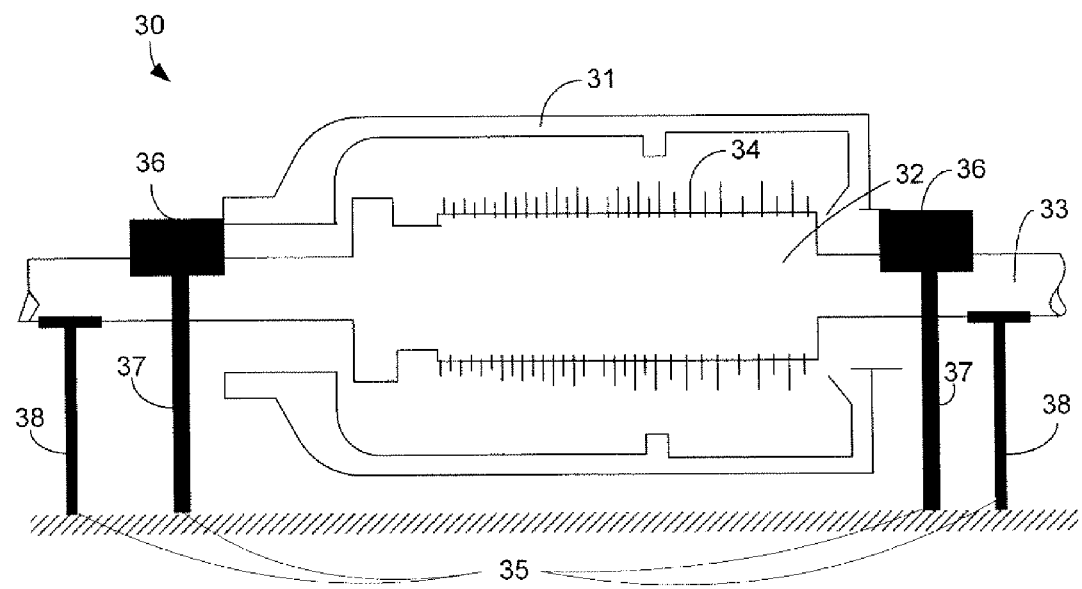
FIG. 3 is a cross-sectional view of a turbine of an embodiment the present application as described herein.

FIG. 3 shows a cross-sectional view of a turbine 30 of an embodiment the present application. A turbine is a rotary machine that extracts mechanical power from energy in a stream of fluid. Nonlimiting examples of turbines include steam turbines and gas turbines. Steam turbines extract mechanical power from pressurized steam whereas gas turbines extract mechanical power from a flow of combustion gas. Turbines generally operate at high temperatures.

In one embodiment, the turbine 30 includes a shell 31, which is the stationary part of the turbine and which also is known as the stator, hood, housing or casing. The turbine 30 also includes a rotor 32, which is the rotating part of the turbine. The rotor 32 includes a shaft 33 with sets of blades 34 that interact with a fluid flow to cause the rotor 32 to turn. Supporting the turbine 30 is a support structure 35 that includes both shell and rotor supports. The outer shell 31 of the turbine 30 has extensions called shell arms 36 that rest on shell support standards 37. The rotor is supported on separate rotor support standards 38.

As the turbine 30 heats during operation, gases flowing through the outer shell 31 of the turbine 30 heat the shell 31. The heat is transmitted through the shell 31 to the shell arms 36 and to the shell support standards 37. Rotor support standards 38 also heat during turbine operation but generally heat to a lesser degree than shell arms 36 and shell support standards 37. In order to avoid differential thermal expansion of the turbine support structure 35, which can disrupt tip clearances inside the turbine 30, the turbine support structure 35 includes a composite material of an embodiment the present application. In a particular embodiment of the present application, the turbine support structure is heated between approximately 0° C. and approximately 2000° C.

Figure 4:
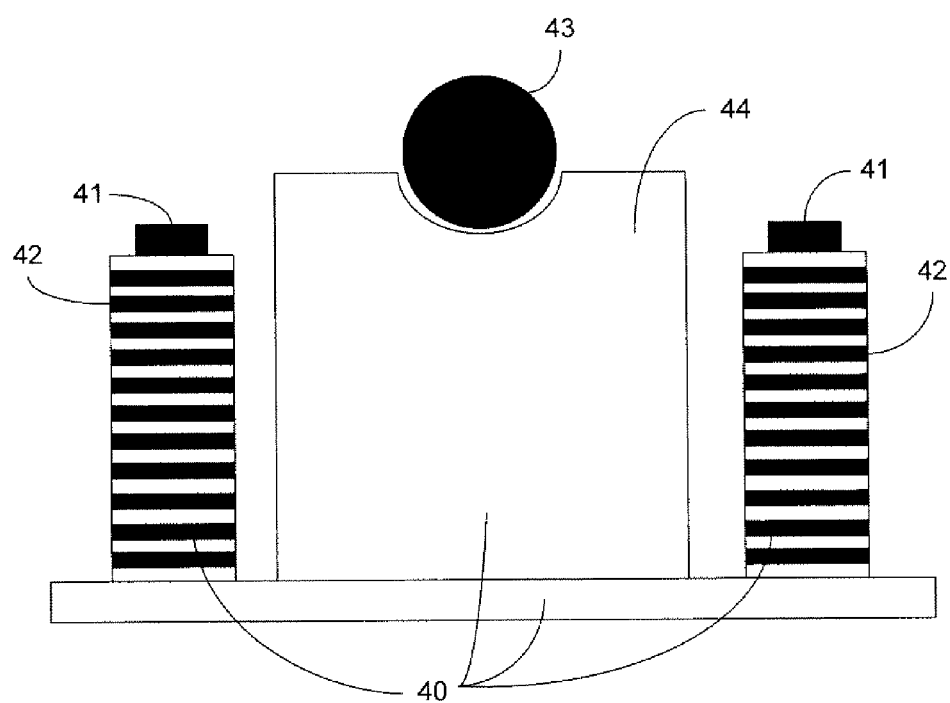
FIG. 4 is an end view of a turbine support structure as described herein.

FIG. 4 shows an end view of a turbine support structure 40 that includes both shell and rotor supports in accordance with an embodiment of the present application. The shell arms 41 rest on shell support standards 42 and support the outer shell of the turbine. The rotor 43 is supported on separate rotor support standards 44. All or part of the turbine support structure may include the composite material described herein. For example, the shell support standards 42 alone may include a first material having a positive coefficient of thermal expansion and a second material having a negative coefficient of thermal expansion, a negative Poisson ratio, or both a negative coefficient of thermal expansion and a negative Poisson ratio. The rotor support standards 44 may include the same material or another material. In an embodiment, the thermal expansion of the shell support standards 42 may be designed to match the vertical growth of the rotor support standards 44 that occurs during turbine operation, thereby avoiding damaging effects on tip clearances inside the turbine.

It should be understood that the foregoing relates only to the preferred embodiments of the present application and that numerous changes and modifications may be made herein without departing from the general spirit and scope of the invention as defined by the following claims and the equivalents thereof.

We claim:

1. A turbine support structure comprising:
   a first material having a positive coefficient of thermal expansion; and
   a second material having a negative coefficient of thermal expansion, a negative Poisson ratio, or both a negative coefficient of thermal expansion and a negative Poisson ratio;
   wherein said first material and said second material provide controlled thermal expansion of said turbine support structure.

2. The turbine support structure of claim 1, wherein said first material comprises metal, ceramic, glass, thermoset polymer, thermoplastics, or alloys or combinations thereof.

3. The turbine support structure of claim 1, wherein said second material comprises iron-nickel alloy, carbon fiber, graphite fiber, carbon nanotubes, aramid fiber, zirconium tungstate, zeolite, or combinations thereof.

4. The turbine support structure of claim 1, wherein said first material and said second material are combined in a manner to provide approximately zero net vertical thermal expansion of said composite material.

5. The turbine support structure of claim 1, wherein said turbine support structure comprises a layered matrix of said first material and said second material.

6. The turbine support structure of claim 1, wherein said second material has a negative coefficient of thermal expansion, further comprising a third material having a negative Poisson ratio.

7. A turbine, comprising:
a turbine support structure which comprises
a first material having a positive coefficient of thermal expansion; and
a second material having a negative coefficient of thermal expansion, a negative Poisson ratio, or both a negative coefficient of thermal expansion and a negative Poisson ratio.

8. The turbine of claim 7, wherein said first material comprises metal, ceramic, glass, thermoset polymer, thermoplastics, or alloys or combinations thereof.

9. The turbine of claim 7, wherein said second material comprises iron-nickel alloy, carbon fiber, graphite fiber, carbon nanotubes, aramid fiber, zirconium tungstate, zeolite, or combinations thereof.

10. The turbine of claim 7, wherein said first material and said second material are combined in a manner to provide approximately zero net vertical thermal expansion of said turbine support structure.

11. The turbine of claim 7, wherein said turbine support structure comprises a layered matrix of said first material and said second material.

12. The turbine of claim 7, wherein said second material has a negative coefficient of thermal expansion, and wherein said turbine support structure further comprises a third material having a negative Poisson ratio.

* * * * *